April 25, 1967        L. CORRSIN        3,316,376
HIGH CAPACITY ELECTROLYTIC COULOMETER AND ELECTRICAL
SWITCHING ARRANGEMENT THEREFOR
Filed Oct. 22, 1965

INVENTOR.
LESTER CORRSIN
BY Hoffman Stone
ATTORNEY

_United States Patent Office_

3,316,376
Patented Apr. 25, 1967

3,316,376
HIGH CAPACITY ELECTROLYTIC COULOMETER AND ELECTRICAL SWITCHING ARRANGEMENT THEREFOR
Lester Corrsin, 138 Highledge Drive,
Penfield, N.Y. 14526
Filed Oct. 22, 1965, Ser. No. 502,066
6 Claims. (Cl. 200—152)

This invention relates to novel electrolytic coulometers, and, more particularly, to coulometers of this type having relatively large current capacity and therefore capable of relatively rapid electrolysis so that they are readily suitable for use as, for example, time integrators for measuring relatively short time intervals.

Electrolytic coulometers of the general type shown by Corrsin in U.S. Patent No. 3,045,178, and by Beusman in U.S. Patent No. 3,193,763 have recently been developed and are being found useful for many different purposes. In general, they are miniaturized devices comprising a pair of capillaries partly filled with a liquid metal, typically mercury, and means for electrolytically transferring the metal between the capillaries. The transfer is in proportion to the amount of electricity passed for the electrolysis, so that the growth of one column of mercury, for example, may be observed to obtain a measure of the time for which a current of known, constant magnitude has flowed through the device.

Devices of this general type heretofore available have been subject to certain limitations that are overcome to a high degree in the practice of the present invention. They have either been of relatively complex design and difficult to make, or they have been of limited current capacity and have had relatively high internal resistances. In the latter case, they are relatively slow in action and are not suitable for use as timing devices for timing relatively short intervals, nor for the direct measurement of any but very small currents.

The coulometers of the present invention have exceptionally high current capacities and low internal resistances, yet they may be made extremely compact, and may easily be designed for ease of manufacture.

The invention will now be described in greater detail in connection with the accompanying drawing, wherein.

Figure 1:
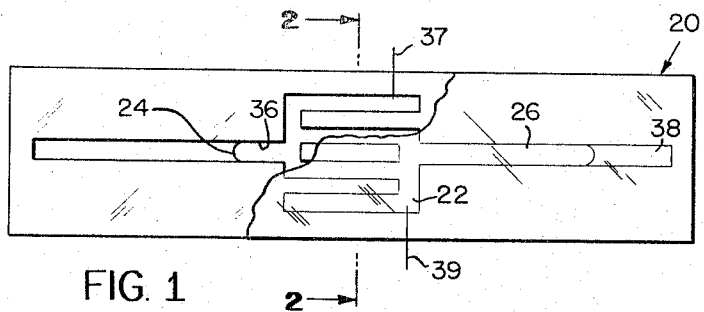
FIGURE 1 is a plan view, with parts broken away of a coulometer according to a first embodiment of the invention.

Briefly, a coulometer of the present invention comprises a relatively thin, slab-like body of an insulating material defining an electrolysis chamber of relatively large area in the direction of the major plane of the body, and a pair of separate, spaced apart capillaries opening into the electrolysis chamber at spaced points therein. A first body of a liquid metal such as mercury fills a first portion of the chamber and extends into one of the capillaries. A second body of mercury fills a second portion of the chamber and extends into the other one of the capillaries. The two bodies of mercury are kept from flowing into contact with each other within the chamber by any of several means, which will be described in detail hereinafater. An electrolyte is contained in the chamber between the two bodies of mercury.

Electrode connections are sealed through the walls of the body of insulating material for making electrical connections to the respective bodies of mercury. The construction is exceedingly compact, yet simple to make, and capable of operating at relatively high currents because of the large surfaces of mercury exposed to the electrolyte. For the same reason, its internal resistance is relatively low, and it may be operated at exceptionally low driving voltages. It is not only more compact and easier to make, but also sturdier and more reliable in operation than the coulometer shown in FIGURE 4 of my previous Patent No. 3,045,178.

Referring now to the drawing, a coulometer according to a first embodiment of the invention comprises a cuboidal, elongated body 20 of insulating material such as glass, or, preferably, a transparent plastic, having a centrally located, maze-like electrolysis chamber 22 and two capillaries 24 and 26, respectively, extending in opposite respective directions from the chamber 22. The body 20 may be made, for example, by laminating two identically grooved plates 28 and 30 in confronting opposition 180° out of register and with their grooved maze portions directly opposed. The lands 32 of the maze portions are relieved slightly from the major planes of each laminate 28 and 30 to permit insertion of an ionically conducting diaphragm 34 which may be, for example, an ion exchange membrane, or a sheet of perforated or porous glass, or a porous sheet material such as filter paper saturated with electrolyte. The mazes (not separately designated) and portions of each capillary 24 and 26 immediately adjacent to the mazes are filled with mercury, and the remote end portions of the capillaries beyond the ends of the mercury columns 36 and 38 are preferably filled with a gas at reduced pressure. Alternatively they may open upon the outer surface of the body. Electrodes 37 and 39 are sealed through the walls of the body 20 to contact the mercury on the opposite respective sides of the diaphragm 34 within the chamber 22. The lands 32 of the maze support the diaphragm so that it does not flex appreciably due to pressure differentials between the gases in the ends of the capillaries 24 and 26, such as are brought about by the lengthening and shortening of the mercury columns 36 and 38 by electrolysis.

Figure 2:
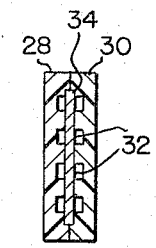
FIGURE 2 is a cross-sectional view taken along the line 2—2 of FIGURE 1.
Figure 3:
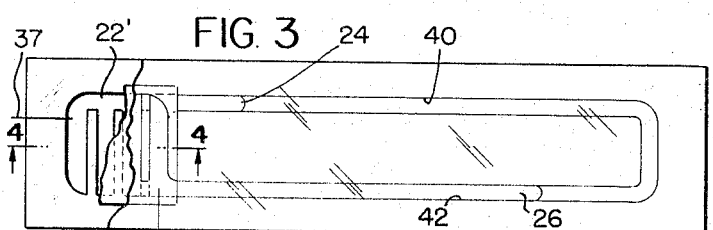
FIGURE 3 is a plan view of a coulometer according to a second illustrative embodiment of the invention.
Figure 4:
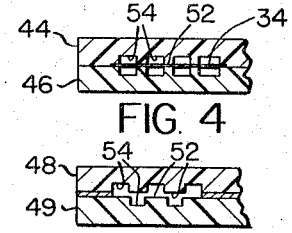
FIGURE 4 is a cross-sectional view taken along the line 4—4 of FIGURE 3.

A second embodiment of the invention is illustrated in FIGURES 3 and 4, and is generally similar to the embodiment shown in FIGURES 1 and 2, except that the capillaries 40 and 42, respectively, are in juxtaposed position and extend in the same direction from the electrolysis chamber 22′, resulting in a more compact construction, or one in which the capillaries may be twice as long as in the first described embodiment without increasing the overall length of the coulometer.

The coulometer illustrated in FIGURES 3 and 4 may be made by laminating two identically grooved plates in confronting relationship with their respective capillary grooves 40 and 42 overlapping at the end of the body remote from the electrolysis chamber 22, so that no pressure differential is exerted across the diaphragm 34 due to changes in the relative lengths of the mercury columns 24 and 26 in the capillaries.

Figure 5:
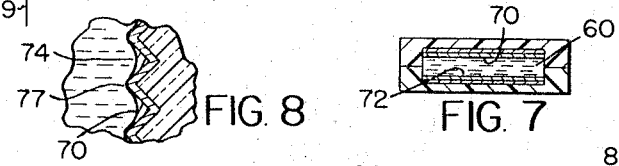
FIGURE 5 is a cross-sectional view generally similar to the view of FIGURE 4 but showing an alternative construction.
Figures 6, 9:
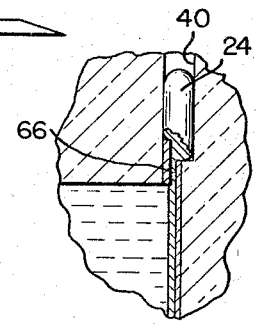
FIGURE 6 is an enlarged, fragmentary view of a portion of the coulometer shown in FIGURE 5.
FIGURE 9 is a cross-sectional view on an enlarged scale of a portion of the coulometer illustrated in FIGURE 7.

In both of the foregoing embodiments, a diaphragm 34 is shown as separating the two bodies of mercury in the electrolysis chamber 22. In both embodiments, relatively large areas of mercury are exposed to the electrolyte, so that the coulometers have relatively low internal resistances, and are capable of accepting relatively large currents. Further improvement in this regard may be achieved, as illustrated in FIGURES 5 and 6, by making the opposing major surfaces of the electrolysis chamber asymmetric, with the lands 52 wider than the grooves 54, and with the grooves 54 of one surface in opposition to the lands 52 of the opposing, or confronting surface. The mercury is contained completely within the grooves by reason of its own surface tension, which restrains it from entering into the relatively narrow openings between the adjacent edges of the opposing lands, which narrow openings are filled with electrolyte.

The principle is more fully described in my copending application filed concurrently herewith, Ser. No. 502,065, entitled, "High Current Capacity Mercury-Type Coulometer." As described in that application, the arrangement produces a stirring action in the electrolyte during operation due to the effect of the electrolysis upon the mercury, so that even more rapid electrolysis may be accomplished without danger of gassing at the mercury surfaces, and therefore even greater currents may be used than in the embodiments illustrated in FIGURES 1 to 4.

Ordinarily, the electrolyte will remain in the narrow openings between the adjacent edges of the opposing lands, and will not penetrate into the grooves 54 sufficiently to displace any appreciable quantity of mercury. Further assurance may be had in this respect, however, if the surfaces of the grooves are platinized, or coated with a film of a similar metal that is substantially insoluble in mercury (does not form an amalgam) but is readily wetted by mercury. The lands 52 are not so coated, but may be treated with a hydrophilic agent such as a silica sol. In this case, the mercury will wet the platinized surfaces of the grooves 52, and prevent entry of the electrolyte into the grooves.

Figures 7, 8:
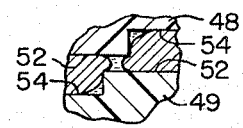
FIGURE 7 is a cross-sectional view generally similar to the views of FIGURES 4 and 5, but showing a third alternative arrangement.
FIGURE 8 is a greatly enlarged fragment of FIGURE 7.

The embodiment illustrated in FIGURES 7, 8, and 9 take advantage of the tenacious characteristic wetting of platinum by mercury to keep the two mercury electrodes in the electrolysis chamber 60 separate and apart. The capillaries 40 and 42, respectively, communicate with the chamber 60 through sub-capillary passageways 66 (only one of which is shown, FIGURE 9). The sub-capillary passageways 66, and the opposed major wall surfaces 70 and 72 of the chamber are platinized. The major wall surfaces 70 and 72 are also preferably striated, or otherwise indented. The mercury tends to wet the surfaces 70 and 72 evenly, and to cover the lands 77 with a film of substantial thickness. The electrolyte is under sufficient pressure to drive the mercury mainly into the striations, or other indentations (not separately designated) in the surfaces 70 and 72, and to reduce the mercury on the lands 77 between the indentations to a thin film. There is thus a balance of forces. The mercury rests largely as fillets 74 in the indentations. It is biased toward escape from the indentations by its surface tension and by its adhesion to the platinum. It is restrained by the electrolyte pressing against it, which opposes the bias erected by the surface tension and wetting action.

The sub-capillaries 66 are filled with mercury, which enters them easily because they are platinized, and which blocks the escape of electrolyte from the chamber 60 into the capillaries 40 and 42.

The volume of the mercury and the electrolyte in the chamber remains at a constant value, and the amount of mercury in the respective capillaries 40 and 42 is determined by the balance between the pressure of the electrolyte working against the biasing action of the mercury. During electrolysis, as mercury is deposited upon one of the surfaces 70 and 72, an equivalent quantity escapes from that surface into the capillary 40 or 42 adjacent to it, and the volume vacated by the escaping mercury is filled by mercury withdrawn from the opposite capillary 42 or 40.

Figure 10:
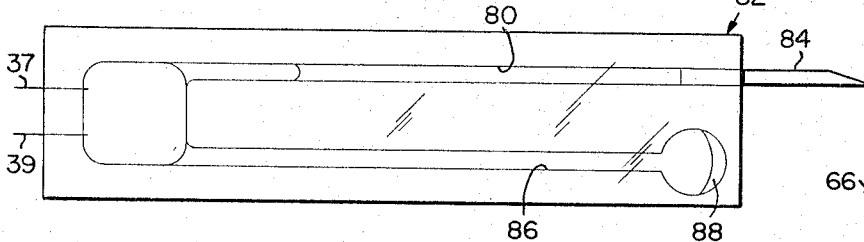
FIGURE 10 is a plan view of a coulometric dispensing device according to the invention.

A dispensing device such as may be used, for example, for controlled injection of a drug or other medicament into animal tissue, or into a test vessel is illustrated in FIGURE 10. The construction may be according to any of the hereinabove described embodiments of the invention, except that one of the capillaries 80 extends through the outer wall of the body 82 and opens exteriorly thereof. It may, if desired, empty into a discharge device such as, for example, a hypodermic needle 84. The other one 86 of the capillaries is terminated within the body 82 in a reserve chamber 88, which is initially partially filled with a gas at atmospheric, or slightly higher than atmospheric pressure. As electrolysis progresses in this instrument, the mercury is transferred from the internally terminated capillary 86 into the exteriorly opening capillary 80 to eject a drug or other medicament from the capillary 80 into the surrounding medium.

The entire device may readily be made in very small sizes, and may be, for example, combined with a miniature dry cell battery so that it could be inserted beneath an animal's skin to test the effect of a slow, controlled infusion of a drug, such as a hormone or other steroid.

Figure 11:
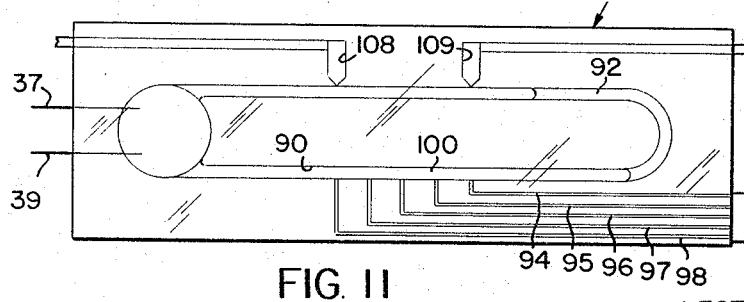
FIGURE 11 is a plan view of a coulometer of the present invention, showing arrangements for producing electrical output signals responsively to the operation thereof.

FIGURE 11 illustrates methods of placing electrical contact electrodes along the capillaries 90 and 92 of a coulometer of the type herein described to facilitate the production of electrical output signals responsively to progress of the electrolysis. As shown, the first capillary 90 is provided with a printed circuit arrangement in which the various conductors 94, 95, 96, 97, and 98 terminate along the wall of the capillary, so that they are contacted successively by the mercury column 100 in the capillary as that column expands. The printed circuit may be laid down on one of the laminated plates that form the body 102 of the coulometer by any desired means such as, for example, by the conventional photo-resist process, or by evaporation of metal in vacuo. The ends of the conductors 94–98 remote from the capillary 90 connect to the conductors (not individually shown) of a tape cable 104, which may be molded between the laminations during the manufacturing process.

The second capillary 92 is provided with a mercury-to-mercury contact arrangement, through a pair of auxiliary capillaries 108 and 109, which open laterally into the main capillary 92 through relatively restricted orifices (not separately designated). When the mercury in the main capillary 92 covers these orifices, it fills them and effects an electrical connection between the mercury in the main capillary and the mercury in the auxiliary capillaries. When the mercury in the main capillary retreats away from the auxiliary capillaries, the mercury in the auxiliary capillaries does not follow, but remains in the auxiliary capallaries due to surface tension effects. The effect is similar to the effect of the restriction in the common clinical thermometer, which causes the mercury column to break at the restriction as the thermometer cools, leaving a short length of mercury isolated above the restriction.

What is claimed is:

1. An electrolytic coulometer comprising an elongated slab-like body of insulating material, a pair of spaced apart capillaries extending length-wise in said body, said body defining an electrolytic chamber therein having its major dimensions in the direction of the major plane of said body and having a width greater than the width of said capillaries, said capillaries opening into said chamber at spaced apart points therein, a first body of a liquid metal in one of said capillaries extending therefrom into said chamber and filling a first predetermined portion thereof primarily on one side of a median plane extending parallel to and between the major surfaces of said slab-like body, a second body of said liquid metal in the other one of said capillaries and extending into said chamber and filling a second predetermined portion thereof separate from said first predetermined portion and primarily on the opposite side of said median plane from said one side, said second predetermined portion being in generally opposed relationship to said first portion, an electrolyte disposed in said chamber between and in contact with said bodies of liquid metal, and means for preventing said bodies of liquid metal from coming into contact with each other.

2. A mercury-type electrolytic coulometer comprising:
 (a) an elongated, slab-like body of insulating material,
  (1) a pair of spaced apart capillary bores extending lengthwise in said body,
  (2) said body defining an electrolytic chamber therein having its major dimensions in the direction of the major plane of said body and having a width greater than the width of said bores,
  (3) said bores opening into said chamber at spaced apart points therein,
  (4) ridges along the major opposed surfaces of said chamber for supporting and rigidifying a flexible sheet centrally in said chamber,
 (b) a first body of mercury in one of said bores and extending therefrom into said chamber along one of the major walls thereof,
 (c) a second body of mercury in the other one of said bores and extending into said chamber along the major wall thereof opposite from said one major wall,
 (d) a porous diaphragm extending across said chamber in a direction parallel to said major walls,
  (1) said diaphragm being supported and rigidified by said ridges,
 (e) an electrolyte saturating said diaphragm and in contact with both of said bodies of mercury, and
 (f) electrode means for connecting said bodies of mercury to an external circuit.

3. A mercury-type electrolytic coulometer comprising:
 (a) an elongated, slab-like body of insulating material,
  (1) a pair of spaced apart capillary bores extending lengthwise in said body,
  (2) said body defining an electrolytic chamber therein having its major dimensions in the direction of the major plane of said body and having a width greater than the width of said bores,
  (3) said bores opening into said chamber at spaced apart points therein,
  (4) ridges along the major opposed walls of said chamber for dividing said chamber into plural capillary regions separated by slot-like apertures that are narrower than said capillary regions.
 (b) a first body of mercury in one of said bores and extending therefrom into said chamber along one of the major walls thereof,
 (c) a second body of mercury in the other one of said bores and extending into said chamber along the major wall thereof opposite from said one major wall,
 (d) an electrolyte filling the space in said chamber between said bodies of mercury, said bodies of mercury being restrained by their own surface tension from entering said slot-like apertures and coming into contact with each other, and
 (e) electrode means for connecting said bodies of mercury to an external circuit.

4. A mercury-type electrolytic coulometer comprising:
 (a) an elongated, slab-like body of insulating material,
  (1) a pair of spaced apart capillary bores extending lengthwise in said body,
  (2) said body defining an electrolytic chamber therein having its major dimensions in the direction of the major plane of said body and having a width greater than the width of said bores,
  (3) said bores opening into said chamber at spaced apart points therein
  (4) indentations of smaller than capillary dimensions in the major opposed walls of said chamber, said major walls being platinized,
 (b) a first body of mercury in one of said bores and extending therefrom into said chamber along one of the major walls thereof,
 (c) a second body of mercury in the other one of said bores and extending into said chamber along the major wall thereof opposite from said one major wall,
 (d) an electrolyte filling the space in said chamber between said bodies of mercury, said electrolyte being under sufficient pressure to reduce the mercury to a thin film on the lands between said indentations and to confine the mercury in said chamber largely to said indentations, and
 (e) electrode means for connecting said bodies of mercury to an external circuit.

5. In a device including a body defining an elongated chamber, mercury in the chamber extending from one end and conforming generally to the cross-sectional dimensions thereof, and means for alternately increasing and decreasing the quantity of mercury in the chamber so that the mercury alternately occupies greater and smaller lengths thereof, the improvement consisting of a contact arrangement for alternately making and breaking an electrical connection between the mercury and a terminal external to the body responsively to the extension and retraction of the mercury in the chamber comprising a passageway extending laterally from the chamber at a selected point along the length thereof, means defining a capillary orifice smaller than the cross-section of said passageway between said passageway and the chamber, and mercury in said passageway, whereby when mercury in the chamber extends to cover said point it comes into contact with the mercury in said passageway and forms a unitary body therewith, and when it thereafter retracts and withdraws away from said point surface tension restrains the mercury in said passageway from passing through said orifice so that electrical contact between the mercury in said chamber and the mercury in said passageway is broken.

6. In an electrolytic coulometer of the type including a body defining an electrolysis chamber, an elongated passageway opening into the chamber, two bodies of a liquid metal in the chamber, an electrolyte between and in contact with the bodies of liquid metal, and means for passing an electric current between the bodies of liquid metal through the electrolyte to transfer metal from one of the bodies of liquid metal to the other thereby selectively to extend one of the bodies of liquid metal into and retract it from the elongated passageway, the improvement consisting of a contact arrangement for alternately making and breaking an electrical connection between the liquid metal and a termial external to the body responsively to the extension and retraction of the liquid metal in the passageway comprising an auxiliary passageway extending laterally from the elongated passageway at a selected point along the length thereof, means defining a capillary orifice smaller than the cross-section of said auxiliary passageway between said auxiliary passageway and the elongated passageway, and liquid metal in said auxiliary passageway, whereby when liquid metal in the elongated passageway extends to cover said orifice it comes into contact with the liquid metal in said auxiliary passageway and forms a unitary body therewith, and when thereafter it retracts and withdraws away from said orifice surface tension restrains the liquid metal in said auxiliary passageway from passing through said orifice so that electrical contact is broken between the liquid metal in the elongated passageway and the liquid metal in said auxiliary passageway.

No references cited.

BERNARD A. GILHEANY, *Primary Examiner.*

R. N. ENVALL, JR., *Assistant Examiner.*